United States Patent [19]

Yamaguchi

[11] 4,448,835
[45] May 15, 1984

[54] WINDOW WEATHER STRIPPING AND THE MANUFACTURING METHOD

[75] Inventor: Toshiaki Yamaguchi, Chiba, Japan

[73] Assignee: Kinugawa Rubber Industrial Co., Ltd., Chiba, Japan

[21] Appl. No.: 398,659

[22] Filed: Jul. 15, 1982

[30] Foreign Application Priority Data

Aug. 31, 1981 [JP] Japan .............................. 56-136638
Aug. 31, 1981 [JP] Japan .............................. 56-136639

[51] Int. Cl.³ ..................... B32B 25/08; B32B 27/08; B32B 27/40
[52] U.S. Cl. ................................ 428/147; 106/236; 308/3 R; 308/187.1; 428/122; 428/409; 428/423.9; 428/425.6; 428/435
[58] Field of Search ..................... 428/409, 141–149, 428/122, 423.9, 425.6, 435; 308/72, 3 R, 187.1; 106/236

[56] References Cited

U.S. PATENT DOCUMENTS 3,218,186 11/1965 DeVries ............................ 428/149
3,594,049 7/1971 Turner ............................. 308/72
4,242,396 12/1980 Wilson et al. ...................... 428/141

FOREIGN PATENT DOCUMENTS 52-12310 1/1977 Japan ............................. 428/143
56-164819 5/1980 Japan ............................. 428/143
55-157660 12/1980 Japan ............................. 428/143
55-157661 12/1980 Japan ............................. 428/143
55-157662 12/1980 Japan ............................. 428/143
55-160063 12/1980 Japan ............................. 428/143

OTHER PUBLICATIONS

Chinnery, "Part I: Elastomeric Dynamic Seals," Jun. 1970, *English Digest*, vol. 31, No. 6, pp. 63, 67–69, 71–76.

*Primary Examiner*—Thomas J. Herbert, Jr.
*Attorney, Agent, or Firm*—Lowe, King, Price & Becker

[57] ABSTRACT

Window weather stripping for sealing a gap between a movable glass and a window frame having less frictional sliding resistance and longer life time at relatively lower manufacturing cost. The window weather stripping according to the present invention comprises at least one microscopically rough surface on which the window glass slides, the rough surface being formed by applying a colloidal paint thereon. The colloidal paint is prepared by mixing a synthetic resin paint with a solvent the solubility of which is smaller than that of the synthetic resin or by mixing the colloidal paint obtained as described above with a non-colloidal paint. The synthetic resin is vinyl chloride, urethane-based resin, acryl-based resin, nylon-based resin, polyolefine chlorination-based resin, etc., and the poor solvent is isopropyl alcohol or methanol.

6 Claims, 16 Drawing Figures

FIG. 6-A PRIOR ART
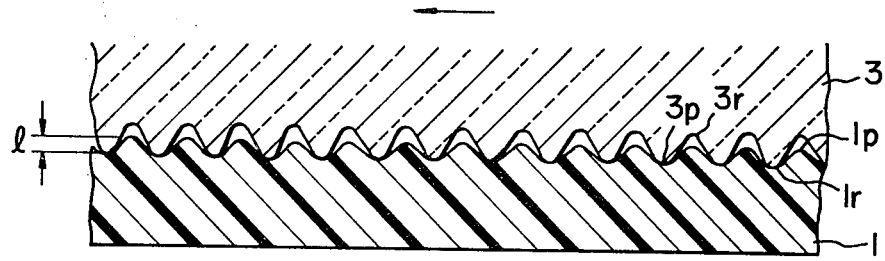
FIG. 6-B PRIOR ART
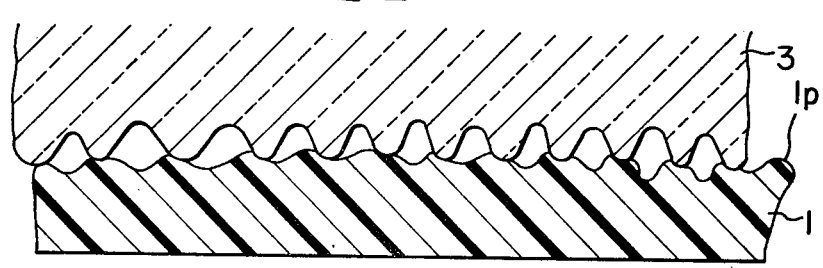
FIG. 6-C PRIOR ART
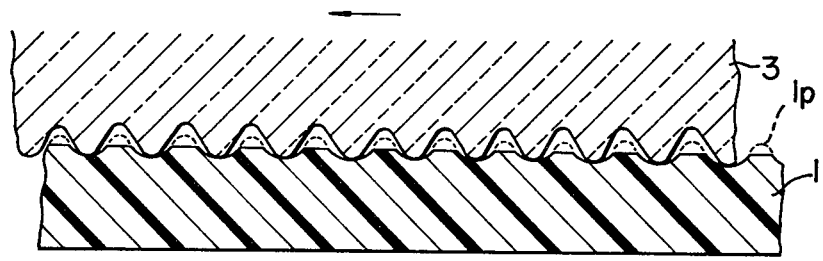

FIG. 15

FRICTION COEFFICIENT

| SAMPLE LABEL | A | B | C | D | E |
|---|---|---|---|---|---|
| PROJECTIONS | YES | NO | NO | NO | NO |
| COLLOIDAL PAINT | NO | NO | ISOPROPYL ALCOHOL IS MIXED | COLLOIDAL NYLON PAINT (5%) IS ADDED | COLLOIDAL NYLON PAINT (5%) INCLUDING SILICON (15%) IS ADDED |
| NO PAINT | 1.88 | (CLOSE CONTACT) | — | — | — |
| URETHANE PAINT | 0.95 | (CLOSE CONTACT) | 0.52 | 0.20 | 0.55 |
| NYLON PAINT | 0.35 | (CLOSE CONTACT) | 0.23 | 0.18 | — |
| ACRYL PAINT | (CLOSE CONTACT) | (CLOSE CONTACT) | — | 0.19 | — |

WINDOW WEATHER STRIPPING AND THE MANUFACTURING METHOD

BACKGROUND OF THE INVENTION

1. Field of the Invention

The present invention relates generally to window weather stripping and a manufacturing method therefor, and more specifically to window weather stripping having microscopically rough surfaces thereon for sealing a gap between a movable window glass and a window frame, and a manufacturing method therefor.

2. Description of the Prior Art

The background of the present invention will be explained with respect to its application to window weather stripping used for an automotive vehicle.

An automotive vehicle normally employs various movable window glasses moved up and down, or opened and closed in the manner of a sliding door, or a single swing door. In such cases, the sliding resistance between the glass and the weather stripping should be as small as possible without adversely effecting airtightness and life time.

There exists a conventional window weather stripping, the surface of which is provided with a textile nap in order to reduce sliding resistance between the window glass and the weather stripping and to improve sealing effect. In such window weather stripping, however, the manufacturing cost is relatively high because of the electrostatic napping method, the attached nap can be easily removed or worn away, and the lift time of the nap tends to be short.

Another conventional weather stripping material has number of projections on its surface in order to improve the sealing effect. In this case, however, the sliding resistance is relatively great.

Exemplary prior-art window weather stripping will be described in more detail with reference to the attached drawings under DETAILED DESCRIPTION OF THE PREFERRED EMBODIMENTS.

SUMMARY OF THE INVENTION

With these problems in mind, therefore, it is the primary object of the present invention to provide window weather stripping with small sliding resistance between weather strip and window glass, and an extended life time.

Further, it is the other object of the present invention to provide a method of manufacturing the window weather stripping having smaller sliding resistance in a mass-production system so as to minimize manufacturing cost.

To achieve the above-mentioned object, the window weather stripping according to the present invention comprises a microscopically rough surface of a colloidal paint on at least one sliding surface of the weather stripping along which the movable window glass slides. The colloidal paint is applied on the sliding surface by a painting machine or with a painting brush.

The colloidal paint is prepared by mixing a synthetic resin paint with a solvent the solubility of which is smaller than that of the synthetic resin or by mixing the colloidal paint obtained as described above with a noncolloidal paint. The synthetic resin is vinyl chloride, urethane-based resin, acryl-based resin, nylon-based resin, polyolefine chlorination-based resin, etc., and the poor solvent is isopropyl alcohol or methanol.

To achieve the above-mentioned object, the method of manufacturing the window weather stripping according to the present invention comprises the steps of extrusion-molding a rubber material into a predetermined shape, vulcanizing the extrusion-molded rubber material, applying a colloidal paint onto the sliding surfaces of the rubber material, and drying and baking the applied colloidal paint.

Further, in the case where a thermoplastic synthetic resin material is used for the weather stripping material, the step of annealing the resin material is included in the last manufacturing steps, instead of the step of vulcanization.

BRIEF DESCRIPTION OF THE DRAWINGS

The features and advantages of the window weather stripping according to the present invention over the prior-art window weather stripping will be more clearly appreciated from the following description of the preferred embodiments of the invention taken in conjunction with the accompanying drawings in which like reference numerals designate the same or similar elements or sections throughout the figures thereof and in which:

FIG. 6-A is an enlarged cross-sectional view microscopically showing a sliding surface of the prior art window weather stripping, indicating that the projected portions of the weather stripping are interengaged with the recessed portions of the window glass;

FIG. 6-B is an enlarged cross-sectional view microscopically showing a sliding surface of the prior-art window weather stripping, indicating that the projected portions of the weather stripping are partially worn away;

FIG. 6-C is an enlarged cross-sectional view microscopically showing a sliding surface of the prior-art window weather stripping, indicating that the projected portions of the weather stripping are fairly worn away;

FIG. 15 shows a list of the friction coefficients of various window weather stripping according to the present invention for comparison with those of the prior-art window weather stripping.

DETAILED DESCRIPTION OF THE PREFERRED EMBODIMENTS

To facilitate understanding of the present invention, a brief reference will be made to prior-art window weather stripping, with reference to the attached drawings.

The doors of an automotive vehicle are provided with various windows with movable window glass, which are usually sealed by window weather stripping made of rubber or synthetic resin. According to the positions at which weather stripping is used, there are various kinds of weather stripping.

Figure 1:
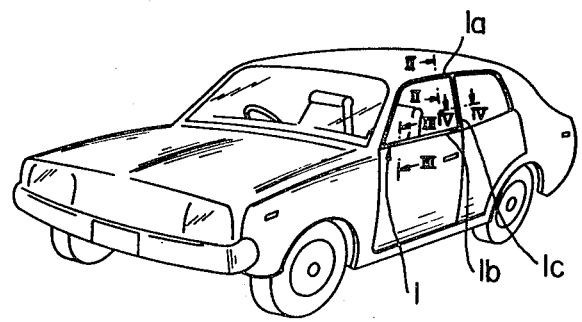
FIG. 1 is a perspective view of an example automotive vehicle on which window weather stripping is mounted.
Figure 2:
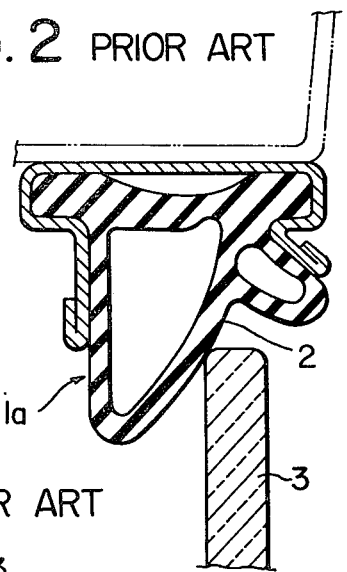
FIG. 2 is an enlarged cross-sectional view taken along the lines II—II of FIG. 1, showing a prior-art window weather stripping.
Figure 3:
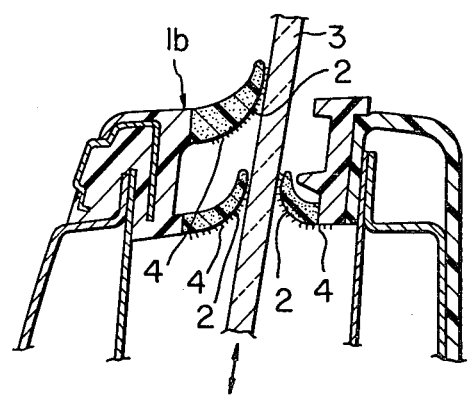
FIG. 3 is an enlarged cross-sectional view taken along the lines III—III of FIG. 1, showing another prior-art window weather stripping on the surface of which textile nap is provided.
Figure 4:
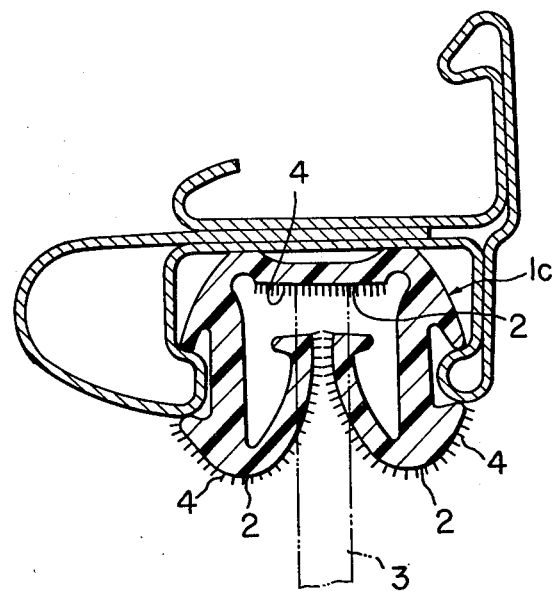
FIG. 4 is an enlarged cross-sectional view taken along the lines IV—IV of FIG. 1, showing the other prior-art window weather stripping on the surface of which textile nap is also provided.

In FIG. 1, in the case of the front side door of an automotive vehicle, for instance, there are used three kinds of window weather stripping such as the upper window weather stripping shown in FIG. 2, the lower window weather stripping shown in FIG. 3 and the side window weather stripping shown in FIG. 4. Further, the door weather stripping is usually made of rubber or thermoplastic synthetic resin as vinyl chloride.

FIG. 2 shows an example prior-art under window weather stripping 1a, on the sliding surface of which no special treatment is provided. In such window weather stripping, there exist shortcomings such that the sliding resistance between the sliding surface 2 and the window glass 3 is relatively large and the sliding surface is easily damaged or worn away.

FIG. 3 shows another example prior-art lower window weather stripping 1b, on the sliding surfaces 2 of which velvet-like soft textile nap 4 is provided.

FIG. 4 shows the other example prior-art side window weather stripping 1c, on the sliding surfaces 2 of which the same velvet-like soft textile nap 4 is provided.

In these lower and side window weather stripping 1b and 1c, however, the manufacturing cost is relatively high because of the electrostatic napping method used, the textile nap is easily removed or worn away, that is, the life time of the nap is not sufficiently long, and further rain water in the nap does not drain well.

Figure 5:
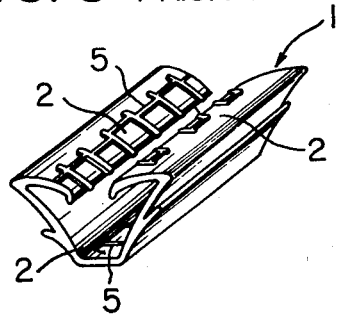
FIG. 5 is an enlarged perspective view showing the other prior-art window weather stripping on the surface of which a number of projections are formed.

FIG. 5 shows another example of prior-art window weather stripping, on the sliding surfaces 2 of which a number of projections 5 are formed. In this window weather stripping, the sliding resistance is noticeably increased.

FIGS. 6-A, B, and C microscopically show the interface of the window weather stripping, without textile nap, with window glass, for assistance in explaining the sliding resistance.

The reason why the sliding resistance of the prior-art window weather stripping is relatively great may be due to the fact that: since the weather stripping 1 is softer than window glass 3, the sliding surface of the weather stripping 1 is easily deformed plastically into the recessed portions 3r on the window glass surface as depicted in FIG. 6-A and therefore the projection portions 1p of the weather stripping 1 interengaged with the recessed portions 3r on the window glass surface are worn away by the projection portions 3p of the window glass 3, as depicted in FIGS. 6-B, and C, as the window glass 3 slides along the window weather stripping 1, thus increasing the coefficient of friction. Further, FIG. 6-B shows the state where the projected portions 1p of the weather stripping are partially and irregularly worn away; the FIG. 6-C shows the state where the projected portions 1p of the weather stripping are fully and uniformly worn away. Briefly, the depth of interengagement 1 is relatively great in the prior-art weather stripping.

In view of the above description, reference is now made to the window weather stripping according to the present invention.

Figure 7:
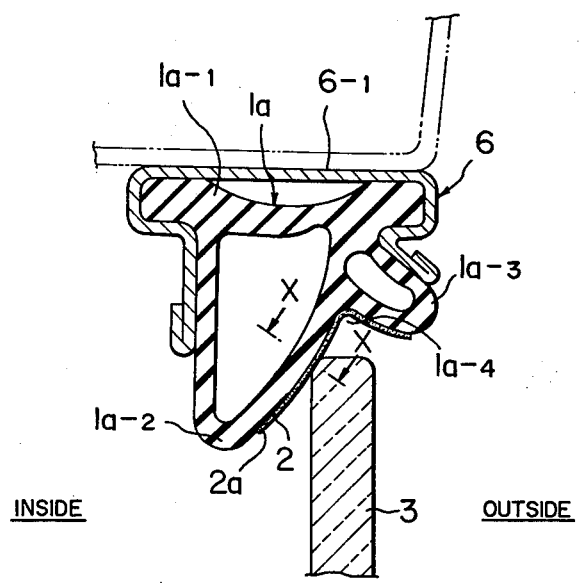
FIG. 7 is the same enlarged cross-sectional view taken along the lines II—II of FIG. 1 as in FIG. 2, showing the window weather stripping according to the present invention.

FIG. 7 shows an upper window weather stripping 1a according to the present invention, which is attached to a door sash 6. The window weather stripping of this type includes a base portion 1a-1 fixed to the bottom portion 6-1 of the door sash 6, a main seal lip portion 1a-2 extending from the base portion 1a-1 toward a passenger compartment side (inside), a sub-lip portion 1a-3 extending from the base portion 1a-1 toward the outside, and a recessed portion 1a-4 between the main seal lip portion and the sub-lip portion toward which a window glass 3 is brought into pressure-contact when moved upward.

The upper window weather stripping is integrally formed by extrusion-molding a soft elastic material such as synthetic resin (for instance, vinyl chloride) or rubber.

Figure 10:
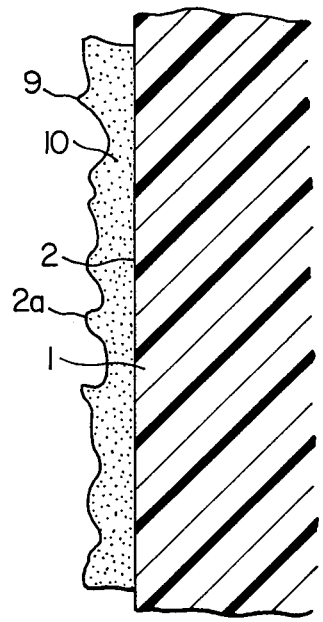
FIG. 10 is an enlarged cross-sectional view microscopically showing a sliding surface of the embodiment of the window weather stripping according to the present invention.

On the sliding surface 2 of the upper window weather stripping 1a on which the glass window 3 slides, there is formed a microscopically rough surface 2a on which a colloidal paint is applied in such a way that projections 9 project beyond the outer surface of the paint layer 10, as depicted in FIG. 10.

Figure 8:
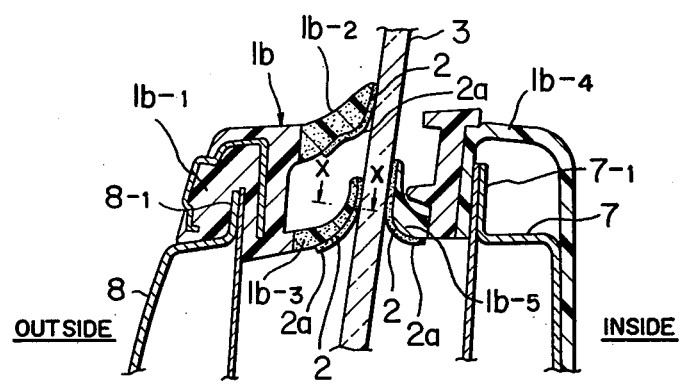
FIG. 8 is the same enlarged cross-sectional view taken along the lines III—III of FIG. 1 as in FIG. 3, showing the window weather stripping according to the present invention.

FIG. 8 shows a lower window weather stripping 1b according to the present invention, which is attached between an inner door panel 7 and an outer door panel 8. The window weather stripping of this type includes an outside base portion 1b-1 fitted to the upper flange portion 8-1 of the outer door panel 8, an upper and lower outside seal lip portions 1b-2 and 1b-3 extending from the outside base portion 1b-1 inwardly toward the window glass 3, an inside base portion 1b-4 fitted to the upper flange portion 7-1 of the inner door panel 7, and an inside lower lip portion 1b-5 extending from the inside base portion 1b-4 outwardly toward the window glass 3.

The window glass 3 is slidably sandwiched between the two outside upper and lower seal lip portions 1b-2 and 1b-3 and the inside seal lip portion 1b-5.

The outside window weather stripping and the inside window weather stripping are separately formed by extrusion-molding a soft elastic material such as synthetic resin (for instance, vinyl chloride) or rubber. On the sliding surfaces 2 of these three inside and outside seal lip portions of the lower window weather stripping 1b on which the glass window 3 slides, there are formed microscopically rough surfaces 2a on which a colloidal paint is applied in such a way that projections 9 project beyond the outer surface of the paint layer 10, as depicted in FIG. 10.

Figure 9:
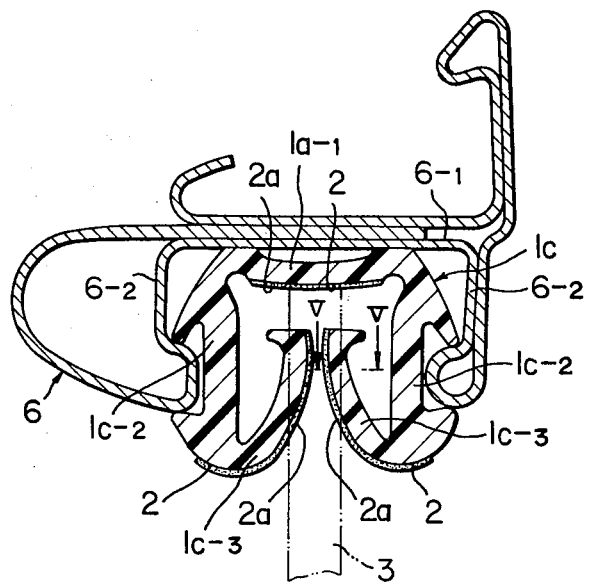
FIG. 9 is the same enlarged cross-sectional view taken along the lines IV—IV of FIG. 1 as in FIG. 4, showing the window weather stripping according to the present invention.

FIG. 9 show a side window weather stripping 1c according to the present invention, which is attached to a door sash 6. The window weather stripping of this type includes a base portion 1c-1 fitted to the bottom portion 6-1 of the door sash 6, two side wall portions 1c-2 fixed to the side wall portions 6-2 of the door sash 6 extending from either end of the base portion 1c-1, and the two lip portions 1c-2 extending from the two side wall portions 60-2 inwardly toward the base portion 1c-1.

The window glass 3 is slidably sandwiched between the two lip portions 1c-3 and brought into pressure-contact with the base portion 1c-1.

The side window weather stripping is integrally formed by extrusion-molding a soft elastic material such as synthetic resin (for instance, vinyl chloride) or rubber.

On the three sliding surfaces 2 of the side window weather stripping 1c on which the glass window 3 slides, there are formed microscopically rough surfaces 2a on which a colloidal paint is applied in such a way that projections 9 project beyond the outer surface of the paint layer 10, as depicted in FIG. 10.

Figure 11:
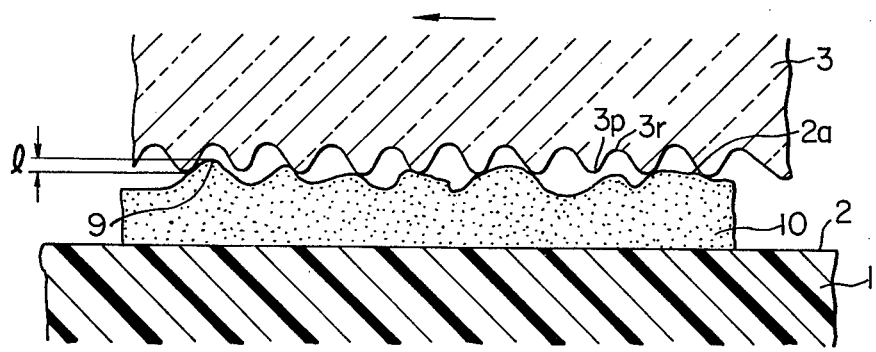
FIG. 11 is an enlarged cross-sectional view microscopically showing a sliding surface of the embodiment of the window weather stripping according to the present invention, indicating that projections on the embodiment of the window weather stripping according to the present invention are interengaged with the recessed portions of the window glass.

FIG. 11 microscopically shows the interface of the window weather stripping according to the present invention with the window glass, for assistance in explaining the sliding resistance. As depicted in the figure, since the projections 9 forming a rough surface 2a are in tangential contact with the projection portions 3p of the window glass 3, the contact area is reduced. Additionally, since the hardness of the projections 9 of the colloidal paint layer 10 is greater than that of the elastic material used for the weather stripping, the depth of interengagement 1 (mean height of projections 9 within the recessed portions 3r of the window glass 3) is also reduced. Therefore, as the window glass 3 slides along the sliding surface 2, the projections 9 are not easily worn away by the window glass 3. In other words, since the coefficient of friction of the rough surface 2a on which the window glass 3 slides is reduced markedly, the sliding resistance is accordingly reduced markedly.

Furthermore, since the projections 9 on the sliding surface 2 of the weather stripping are embedded in the colloidal paint layer 10 or mixed throughout, the projections on the sliding surface form irregular multiple layers, so that as some projections 9 wear away, others are exposed to perform the same function, thus the life-time of the window weather stripping according to the present invention is very long.

Now, with reference to the attached drawings, the methods of preparing a colloidal paint applied onto the sliding surfaces (on which glass window 3 slides) of the window weather stripping according to the present invention will be described hereinbelow.

Figure 12:
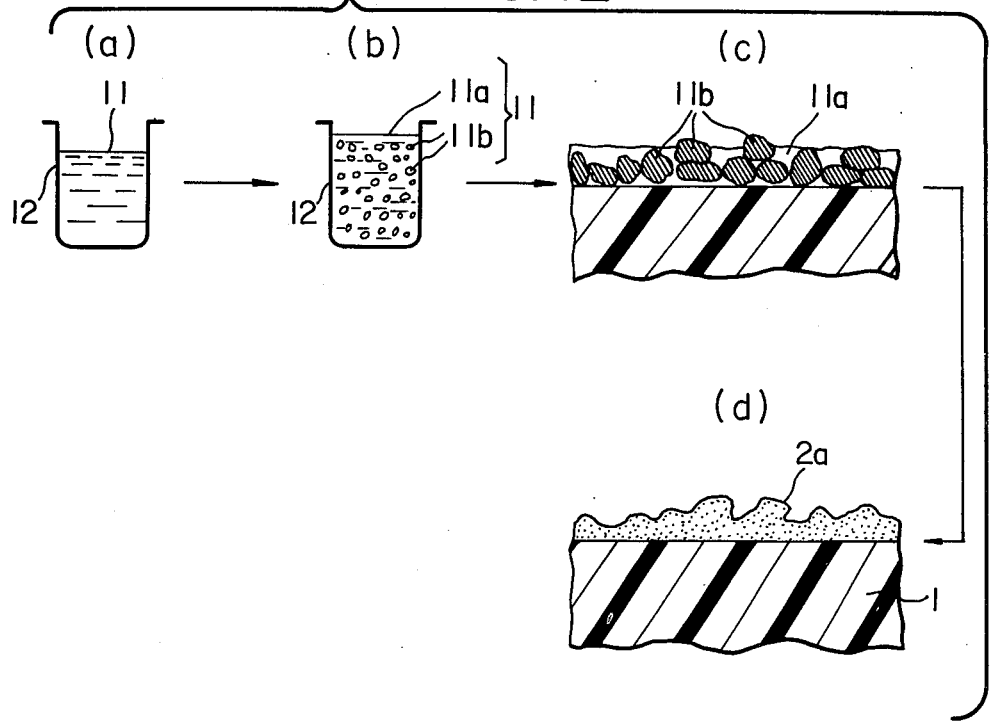
FIG. 12 is an illustration for assistance in explaining a first method of preparing a colloidal paint applied onto the sliding surfaces of the window weather stripping according to the present invention.

FIG. 12 shows a first method thereof. First, a paint 11 is prepared within a vessel 12 as depicted by label (a). The paint 11 is the one manufactured by dissolving solid-state synthetic resin such as vinyl chloride, urethane-based resin, acryl-based resin, nylon-based resin or polyolefine chlorination-based resin. In the case of FIG. 12, the paint 11 is methanol-soluble nylon paint. Next, a solvent (poor solvent) of relatively low solubility compared with the paint 11 is mixed with the paint 11 and stirred therewith. The poor solvent is, for instance, isopropyl alcohol or ethanol. When the poor solvent is mixed with the paint, colloidal particles 11b cohered in the liquid paint 11a including poor solvent are dispersed, as depicted by label (b).

The colloidal paint thus manufactured is applied onto the sliding surfaces of the window weather stripping on which glass window slides, as depicted by label (c), in which the numeral 11(a) denotes liquid paint and the numeral 11(b) denotes cohered colloidal particles. Lastly, the applied colloidal paint is dried and baked in order to form a microscopically rough surface 2a on the sliding surface 2 of the window weather stripping 1, as depicted by label (d).

Experiments indicate that it is possible to obtain colloidal urethane paint the friction coefficient of which is smaller than that of non-colloidal urethane paint, in the case where urethane paint is first mixed and dissolved with a solvent of about nine solubility parameter and next further mixed and stirred with a poor solvent of about eleven solubility parameter. In this case, the solvent of nine solubility parameter is methylethylketone, toluene, acetone, or trichloroethylene and the poor solvent of eleven solubility parameter is isopropyl alcohol.

Similarly, experiments indicate that it is possible to obtain colloidal polypropylene chlorination paint the friction coefficient of which is smaller than that of non-colloidal polypropylene chlorination paint, in the case when polypropylene chlorination paint is first dissolved by toluene and next mixed with paraxylene in order to obtain colloidal paint.

Furthermore, experiments indicate that it is possible to obtain colloidal paint the friction coefficient of which is smaller than that of non-colloidal paint, in the case where silicone oil, polyethylene wax, or gel-state nylon is added to a gel paint.

Figure 13:
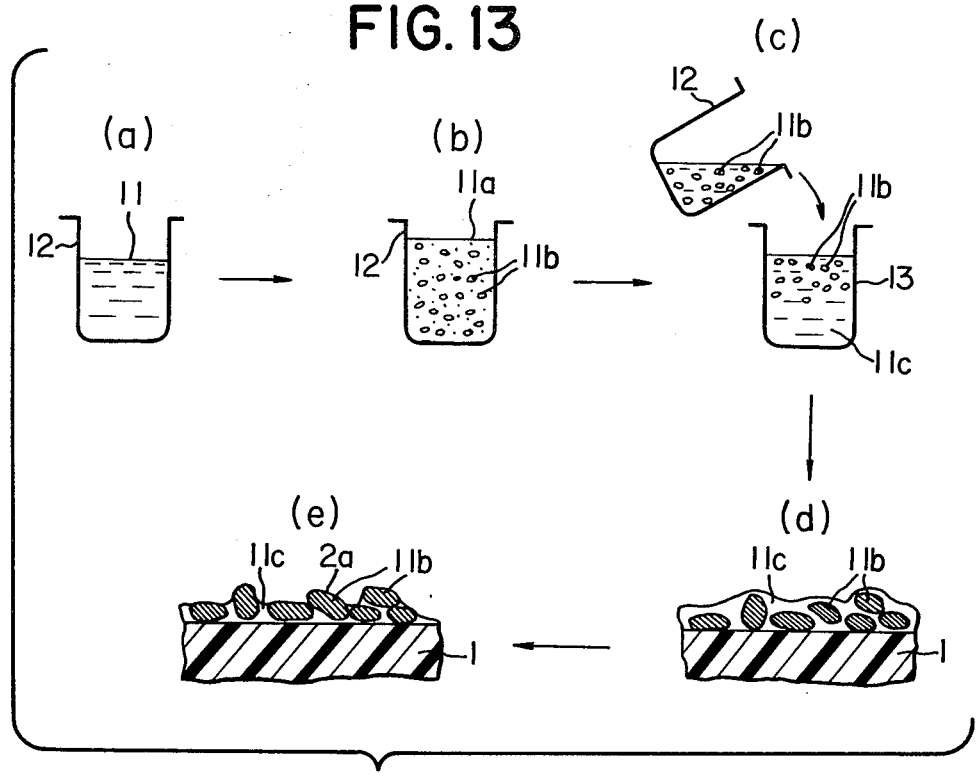
FIG. 13 is an illustration for assistance in explaining a second method of preparing a colloidal paint applied onto the sliding surfaces of the window weather stripping according to the present invention.

FIG. 13 shows a second method of preparing a colloidal paint applied onto the sliding surfaces. First a paint 11 is prepared within a vessel 12 as depicted by label (a). The paint 11 is the one manufactured by dissolving solid-state synthetic resin such as vinyl chloride, urethane-based resin, acryl-based resin, nylon-based resin or polyolefine chlorination-based resin. In the case of FIG. 13, the paint 11 is nylon paint dissolved by phenol, formic acid or cresol. Next, a solvent (poor solvent) of relatively low solubility compared with the paint 11 is mixed with the paint 11 and stirred therewith. The preferable poor solvent is, for instance, isopropyl alcohol or methanol.

In this case, however, isopropyl alcohol or methanol is not necessarily produce sufficient colloidal particles in conjunction with the above-mentioned all synthetic resins. Therefore, in order to obtain appropriate colloidal paints, various experiments are necessary.

When the poor solvent is mixed with the paint, colloidal particles 11b cohered in the liquid paint 11a including poor solvent are dispersed, as depicted by label (b).

Next, being different from the first method, the colloidal paint in the vessel 12 thus obtained is added to another synthetic resin in another vessel 13, as depicted by label (c). The synthetic resin in the vessel 13 is, for instance, methanol-soluble nylon paint.

In this second embodiment, it is possible to obtain colloidal paint of urethane-based resin. The second method is especially useful for the case where paints difficult to obtain colloidal particles are required to use for the window weather stripping. In other words, depending upon this method, it is possible to obtain any kinds of paints including colloidal particles.

The colloidal paint thus manufactured is applied onto the sliding surfaces of the window weather stripping on which glass window slides, as depicted by label (d), in which the numeral 11(b) denotes cohered colloidal particles and the numeral 11(c) denotes liquid paint. Lastly, the applied colloidal paint is dried and baked in order to form a microscopically rough surface 2a on the sliding surface 2 of the window weather stripping, as depicted by label (e).

Now, with reference to the attached drawings, the methods of manufacturing the window weather stripping according to the present invention will be described hereinbelow.

Figure 14:
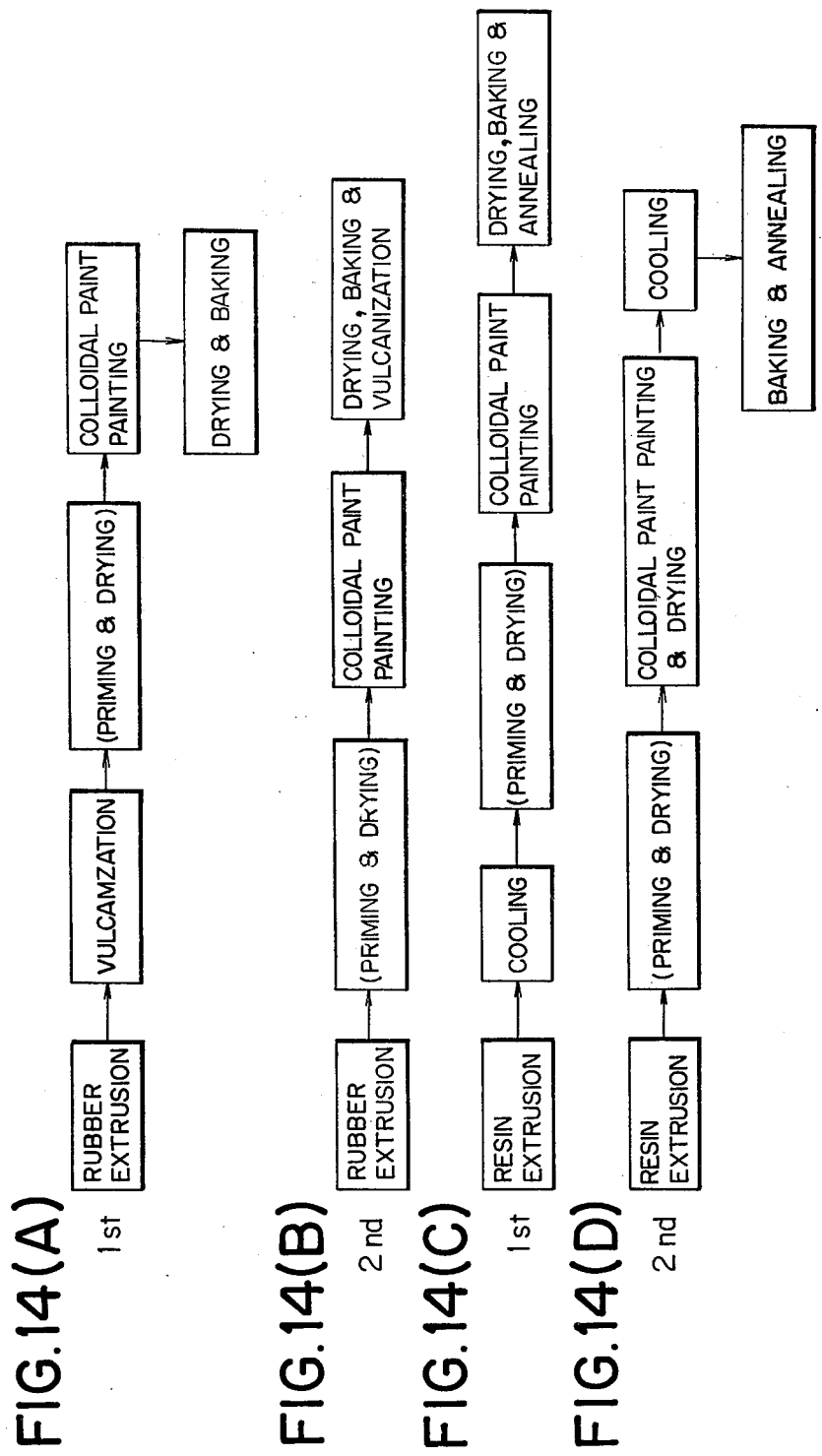
FIG. 14(A) is a flowchart showing a first method of manufacturing the embodiment of the rubber window weather stripping according to the present invention.
FIG. 14(B) is a flowchart showing a second method of manufacturing the embodiment of the rubber window weather stripping according to the present invention.
FIG. 14(C) is a flowchart showing a first method of manufacturing the embodiment of the thermoplastic synthetic resin window weather stripping according to the present invention.
FIG. 14(D) is a flowchart showing a second method of manufacturing the embodiment of the thermoplastic synthetic resin window weather stripping according to the present invention.

FIG. 14(A) shows a first method of manufacturing of the rubber window weather stripping according to the present invention.

In this first method, a rubber material is first extrusion-molded into a predetermined shape by an extruding machine. Next, the molded window weather strip is vulcanized into a final predetermined shape by a vulcanizing machine. Thirdly, a colloidal paint is applied on the sliding surface of the vulcanized weather strip body by a roller painting machine or with a painting brush in order to form microscopically rough surfaces. Fourthly, the applied colloidal paint is dried and then baked in a heater at about 120° C. for about five minutes. Further, in this case, where necessary according to the kinds of rubber material and colloidal paint, priming step is additionally performed between vulcanization and colloidal paint painting by a roller painting machine or with a painting brush. In this priming step, any one of bonding agents (CR-based, urethane-based, polyolefine chlorination-based, etc.) is applied and then dried. That is to say, the first method of rubber weather strip is as follows: rubber extrusion (1st step), rubber vulcanization (2nd step), (priming and drying), colloidal paint painting (3rd step), and colloidal paint drying and baking (4th step).

FIG. 14(B) shows a second method of manufacturing of the rubber window weather stripping according to the present invention.

In this second method, a rubber material is first extrusion-molded into a predetermined shape by an extruding machine. Here, a priming paint is applied on the sliding surfaces of the molded weather strip body by a roller painting machine or with a painting brush, where necessary, and is then dried. Next, a colloidal paint is applied on the primed surfaces, that is, on the sliding surfaces of the molded weather strip body by a roller painting machine or with a painting brush in order to form microscopically rough surfaces. Thirdly, the applied colloidal paint is dried and baked by utilizing the heat generated when the molded window weather strip is vulcanized by a vulcanizing machine. That is to say, the second method of rubber weather strip is as follows: rubber extrusion (1st step), (priming and drying), colloidal paint painting (2nd step), and colloidal paint drying and baking during rubber vulcanization (3rd step).

FIG. 14(C) shows a first method of manufacturing of the thermoplastic synthetic resin window weather stripping according to the present invention.

In this method, a thermoplastic synthetic resin such as vinyl chloride is first extrusion-molded into a predetermined shape by an extrusion machine. Next, the extruded window weather strip is cooled into a final predetermined shape by a cooling machine to harden the resin. Thirdly, a colloidal paint is applied on the sliding surfaces of the cooled weather strip body by a roller painting machine or with a painting brush in order to form microscopically rough surfaces. Fourthly, the applied colloidal paint is dried and baked in a heater at about 120° C. for about five minutes while annealing the thermoplastic synthetic resin. Further, in this case, where necessary according to the kinds of thermoplastic synthetic resin material and colloidal paint, priming step is additionally performed between cooling and colloidal paint painting by a roller painting machine or with a painting brush. In this priming step, any one of bonding agents (CR-based, urethane-based, polyolefine chlorination-based, etc.) is applied and then dried. That is to say, the first method of thermoplastic synthetic resin weather strip is as follows: synthetic resin extrusion (1st step, cooling (resin hardening) (2nd step), (priming and drying), colloidal paint painting (3rd step), and colloidal paint drying and baking and thermoplastic synthetic resin annealing (4th step).

FIG. 14(D) shows a second method of manufacturing of the thermoplastic synthetic resin window weather stripping according to the present invention.

In this second method, a thermoplastic synthetic resin material is first extrusion-molded into a predetermined shape by an extruding machine. Here, a priming paint is applied on the sliding surfaces of the molded weather strip body by a roller painting machine or with a painting brush, where necessary, and is then dried by utilizing the heat generated when the resin is extruded. Next, a colloidal paint is applied on the primed surfaces, that is, on the sliding surfaces of the molded weather strip body by a roller painting machine or with a painting brush in order to form microscopically rough surfaces and then tried by utilizing the heat generated when the resin is extruded. Thirdly, the dried colloidal paint is cooled by a cooling machine in order to harden the resin. Lastly, the applied colloidal paint is baked in a heater at about 120° C. for about five minutes while annealing the thermoplastic synthetic resin. That is to say, the second method of thermoplastic synthetic resin weather strip is as follows: synthetic resin extrusion (1st step), (priming and drying), colloidal paint painting and drying (2nd step), cooling (resin hardening) (3rd step), and colloidal paint baking and thermoplastic resin annealing (4th step).

To avoid confusion, now follows the description of the figures and the ordinal numbers representing the methods used above.

FIGS. 14(A) and (B) show the cases of rubber window weather stripping according to the present invention, while FIGS. 14(C) and (B) shows the cases of thermoplastic synthetic resin weather stripping according to the present invention. Further, the first embodiment means the cases where the step of vulcanization (in the case of rubber) or the step of cooling or hardening (in the case of resin) is performed after the step of extrusion-molding but before the step of colloidal paint painting. While the second embodiment means the case where step of vulcanization (in the case of rubber) or the step of cooling or hardening (in the case of resin) is performed after the step of colloidal paint painting.

Lastly, the following experiments have been made in order to compare the friction coefficients of the various window weather strip according to the present invention with those of the prior-art window weather strip on which a number of projections are formed or not formed. FIG. 15 lists the experiment results.

Figure 16:
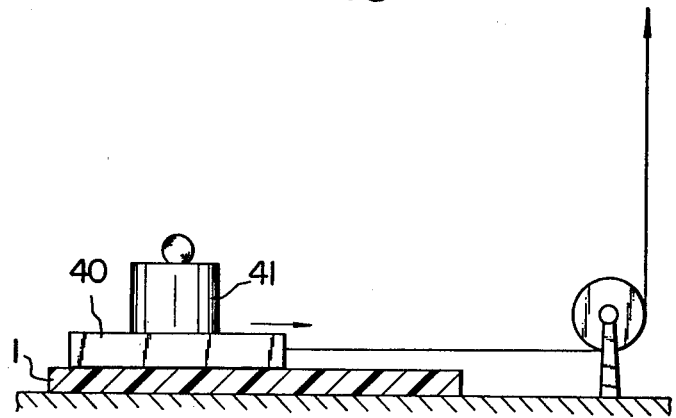
FIG. 16 is an illustration showing the method of measuring the friction coefficients of the window weather stripping according to the present invention.

The friction coefficients are measured by sliding a glass plate 40 on which a weight 41 is mounted across a sheet of rough-surfaced material, as depicted in FIG. 16. The total weight W is 1,110 g including the glass (weight 41: 1,000 g glass 40: 110 g). The sample size is 40 mm wide, 120 mm long and 2 mm thick. A tension F is applied to the glass plate so that a sliding speed of 500 mm/min. will be maintained.

The sample A is prior-art window weather strip on the surface of which a number of projections are formed, as in the prior art, without any colloidal paint thereon. In the case where no paint is applied on the sliding surface thereof, its coefficient of friction is 1.88; while its coefficients of friction are 0.95 in the case where urethane paint is applied thereon, 0.35 in the case where acryl paint is applied thereon, and great inducing close contact with window glass in the case where acryl paint is applied thereon.

The sample B is prior-art window weather strip on the surface of which no projection is formed, without any colloidal paint thereon. In this case, no paint or paint, its coefficients are great inducing close contact with window glass.

The sample C is window weather strip according to the present invention on the sliding surface of which colloidal paints obtained by the first method are applied. Its coefficients of friction are 0.52 in the case where isopropyl alcohol is mixed with urethane-based paint and 0.23 in the case where iospropyl alcohol is mixed with nylon-based paint.

The sample D is window weather strip according to the present invention on the sliding surface of which colloidal paints obtained by the second method are applied. Its coefficients of friction are 0.20 in the case where colloidal nylon paint of five percent is added to urethane paint, 0.18 in the case where colloidal nylon paint of five percent is added to nylon paint, and 0.19 in the case where colloidal nylon paint of five percent is added to acryl paint.

The sample E is window weather strip according to the present invention on the sliding surface of which colloidal paint obtained by the second method is applied. Its coefficient of friction is 0.55 in the case where colloidal nylon paint of five percent which includes silicon of 15 percent is added to urethane-based paint.

The list shown in FIG. 15 indicates that:

(a) colloidal paints are better than ordinary paints with respect to coefficient of friction, and (b) ordinary or colloidal nylon paints are better than ordinary or colloidal urethane paint with respect to coefficient of friction.

As described above, since a rough surface including colloidal particles is formed on the sliding surfaces of the window weather strip on which window glass slides, the coefficient of friction between the weather strip and window glass is markedly reduced and the sliding resistance is accordingly reduced.

Furthermore, since the colloidal particles are strongly fixed onto the sliding surfaces together with paint, the particles are not easily worn away and therefore the life time of the rough surfaces is relatively long.

Furthermore, since the rough surfaces are formed on the sliding surfaces, rain water thereon will drain well.

Furthermore, since the rough surfaces are formed by painting the colloidal paint onto the sliding surfaces by using a roller painting machine, the manufacturing steps are simplified and the materials can be well controlled, the productivity is high, thus reducing the manufacturing cost.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. Window weather stripping for sealing a gap between a movable glass and a window frame, which comprises a strip of elastic material made of rubber or a synthetic resin, said strip having a microscopic rough surface on at least one surface thereof, along which the movable glass slides, said rough surface being formed by painting a liquid-state colloidal paint having cohered colloidal particles dispersed therein, said colloidal paint being prepared by dissolving a solid-state synthetic resin in a first solvent having good solubility for the solid-state synthetic resin, and then mixing the resulting solution with a second solvent having poor solubility for the solid-state synthetic resin, as compared with the first solvent, and drying the paint.

2. Window weather stripping as set forth in claim 1, wherein said solid-state synthetic resin is methanol-soluble nylon resin, said first solvent is methanol, and said second solvent is isopropyl alcohol or ethanol.

3. Window weather stripping as set forth in claim 1, wherein said solid-state synthetic resin is urethane resin, said first solvent is methylethylketone, toluene, acetone, or trichloroethylene, and said second solvent is isopropyl alcohol.

4. Window weather stripping for sealing a gap between a movable glass and a window frame, which comprises a strip of elastic material made of rubber or a synthetic resin having a microscopic rough surface on at least one surface of said strip, along which the movable glass slides, said rough surface being formed by painting a mixture of a liquid-state colloidal paint including cohered colloidal particles dispersed therein and a first liquid-state synthetic resin paint, said colloidal paint being prepared by dissolving a solid-state synthetic resin in a first solvent having good solubility for the solid-state synthetic resin, and then mixing the resulting solution with a second solvent having poor solubility for the solid-state synthetic resin, as compared with the first solvent, and drying the paint.

5. Window weather stripping as set forth in claim 4, wherein said first liquid-state synthetic resin paint is urethane resin dissolved in methylethylketone, toluene, acetone, or trichloroethylene, said solid-state synthetic resin is nylon, said first solvent is phenol or cresol, and said second solvent is methanol or isopropyl alcohol.

6. Window weather stripping as set forth in claim 4, wherein said first liquid-state synthetic resin paint is methanol-soluble nylon dissolved in methanol, said solid-state synthetic resin is nylon, said first solvent is phenol or cresol, and said second solvent is methanol or isopropyl alcohol.

* * * * *